US009264559B2

(12) United States Patent
Motoyanagi et al.

(10) Patent No.: US 9,264,559 B2
(45) Date of Patent: Feb. 16, 2016

(54) METHOD, APPARATUS, AND COMPUTER PROGRAM PRODUCT FOR PRINTING IMAGE ON DISTENDABLE SHEET

(71) Applicant: CASIO COMPUTER CO., LTD., Tokyo (JP)

(72) Inventors: Yoshimune Motoyanagi, Hamura (JP); Shinji Nakata, Higashiyamato (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 14/579,031

(22) Filed: Dec. 22, 2014

(65) Prior Publication Data

US 2015/0174925 A1 Jun. 25, 2015

(30) Foreign Application Priority Data

Dec. 25, 2013 (JP) ................................. 2013-266699

(51) Int. Cl.
| | |
|---|---|
| H04N 1/387 | (2006.01) |
| B41J 3/407 | (2006.01) |
| G06T 7/60 | (2006.01) |
| G06K 15/02 | (2006.01) |
| H04N 1/00 | (2006.01) |
| B41J 11/00 | (2006.01) |

(52) U.S. Cl.
CPC ........... *H04N 1/00045* (2013.01); *B41J 3/4073* (2013.01); *B41J 11/0015* (2013.01); *G06K 15/1868* (2013.01); *G06T 7/60* (2013.01); *H04N 1/387* (2013.01)

(58) Field of Classification Search
None
See application file for complete search history.

(56) References Cited

U.S. PATENT DOCUMENTS

| | | | | |
|---|---|---|---|---|
| 7,459,252 | B2 * | 12/2008 | Yaguchi et al. ............. | 430/108.6 |
| 2003/0175602 | A1 * | 9/2003 | Kazama ........................ | 358/3.26 |
| 2012/0176633 | A1 * | 7/2012 | Koyama ................. | B41J 3/4073 358/1.9 |
| 2012/0200867 | A1 * | 8/2012 | Fujita et al. .................... | 358/1.9 |
| 2013/0168903 | A1 * | 7/2013 | Horiuchi et al. .............. | 264/413 |

FOREIGN PATENT DOCUMENTS

| | | |
|---|---|---|
| JP | H09-48170 A | 2/1997 |
| JP | 2001-150812 A | 6/2001 |
| JP | 2006-267520 A | 10/2006 |
| JP | 2012-158042 A | 8/2012 |
| JP | 2012-171317 A | 9/2012 |

OTHER PUBLICATIONS

Office Action dated Aug. 25, 2015 in Application No. 2013-266699 from Japan Patent Office.

* cited by examiner

*Primary Examiner* — Scott A Rogers
(74) *Attorney, Agent, or Firm* — Scully, Scott, Murphy & Presser, PC (57) ABSTRACT

A printing method includes the steps of: printing a predetermined pattern on a distendable sheet before distending; distending the distendable sheet printed the predetermined pattern; calculating a displacement amount of the predetermined pattern between before and after the distending of the distendable sheet; deforming an original image by a deformation amount determined based on the calculated displacement amount; and printing the deformed original image as an image for printing on the distendable sheet.

26 Claims, 13 Drawing Sheets

FIG. 4A   TD IMAGE BEFORE DISTENDING

⇩ HEATING

FIG. 4B   TD IMAGE AFTER DISTENDING

COLOR ORIGINAL IMAGE

FIG. 6B

PRINTING IMAGE

FIG. 9A COLOR ORIGINAL IMAGE

FIG. 9B TD IMAGE

FIG. 10A    TD IMAGE BEFORE DISTENDING

⇩ HEATING

FIG. 10B    TD IMAGE AFTER DISTENDING

FIG. 11

FIG. 12A    COLOR ORIGINAL IMAGE

FIG. 12B    PRINTING IMAGE — DEFORMATION

METHOD, APPARATUS, AND COMPUTER PROGRAM PRODUCT FOR PRINTING IMAGE ON DISTENDABLE SHEET

CROSS-REFERENCE TO RELATED APPLICATIONS

This application claims the benefit of Japanese Patent Application No. 2013-266699, filed on Dec. 25, 2013, the entire disclosure of which is incorporated by reference herein.

BACKGROUND OF THE INVENTION

1. Field of the Invention

The present invention relates to a printing method, a printing apparatus, and a computer readable non-transitory recording medium storing a printing program.

2. Description of the Related Art

TD printing (Thermal Distend) is known as one of foam molding techniques. The TD printing is a texture expressing technique capable of expressing various shadows or real texture with a distendable sheet by forming undulations or minute irregularities on a surface thereof. For example, one example of the foam molding technique is disclosed in JP 2001-150812 A.

According to the technique disclosed in JP 2001-150812 A, a visible plane image, such as a color image, is formed on a surface of a distend layer of a distendable sheet which includes many microcapsules to be expanded by heating. Next, a light absorbing pattern of a gradation image based on distance image data or the like expressing a stereoscopic shape relative to the plane image is formed on a surface of a substrate corresponding to a reverse surface of the distend layer of the distendable sheet. Then, by irradiating the pattern with a light source from a substrate layer side, heat according to gradation of the image is generated and the microcapsules inside the distend layer are expanded. As a result, protrusions having predetermined heights are formed in the plane image, thereby enabling the expression of texture.

A procedure of the TD printing is outlined as follows. First, a TD image for distending is printed on a TD paper with a toner containing carbon black to generate a gray image for distending. Then, the TD paper is heated by a light source, such as a halogen lamp, and the TD paper distended to hide the gray image for distending is printed with white. Finally, a color image for finishing is printed thereon, thereby generating the color image expressing a texture having irregularities.

Figure 13A:
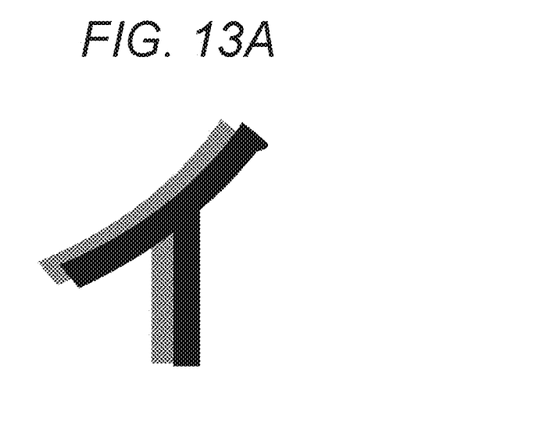
FIGS. 13A to 13C are diagrams referred to in explaining color printing displacement between distend and a finished print.
Figure 13B:
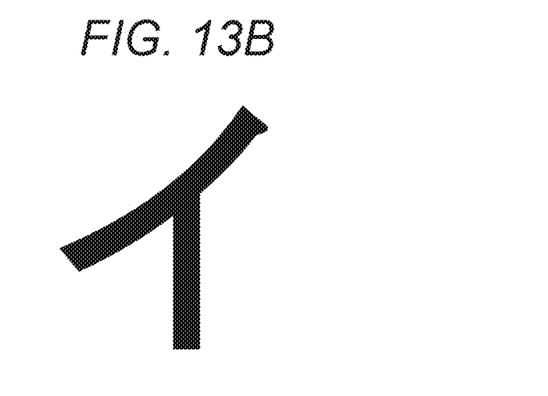

Incidentally, according to the above-described conventional TD printing, the image may be distorted by irregularities of distending. Therefore, if the color image for finishing is printed thereon, there has been a problem in that distending occurs and the color image is displaced. For example, FIG. 13A illustrates an image of the printing displacement. For comparison, FIG. 13B illustrates an image in a case where printing displacement does not exist. FIGS. 13A and 13B both illustrate a character "T" (deformed) which comparatively easily causes printing displacement in the TD printing.

Figure 13C:
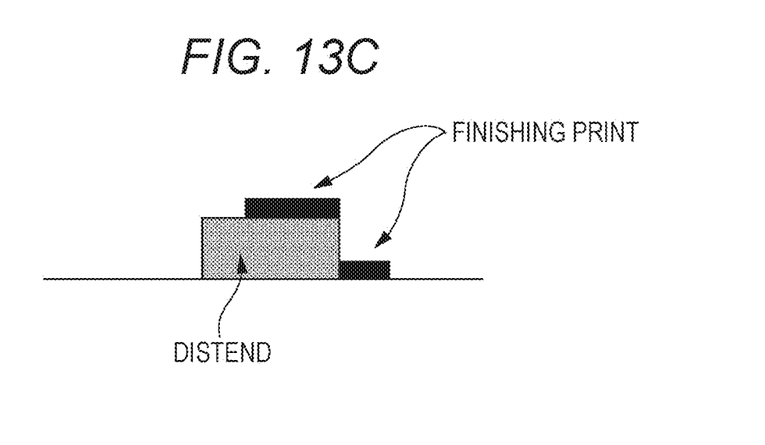

In FIG. 13A, a gray portion is an image of a protruding part after distending, and a black portion is a finished print after distending. FIG. 13C illustrates a cross-section of the image illustrated in FIG. 13A. As illustrated, it can be understood that the finished print and the distending portion are displaced. On the other hand, in the comparative example illustrated in FIG. 13B, since the finished print and the distending portion overlap, the distending (gray) portion does not appear.

BRIEF SUMMARY OF THE INVENTION

A printing method according to the present invention includes the steps of: printing a predetermined pattern on a distendable sheet before distending; distending the distendable sheet printed the predetermined pattern; calculating a displacement amount of the predetermined pattern between before and after the distending of the distendable sheet; deforming an original image by a deformation amount determined based on the calculated displacement amount; and printing the deformed original image as an image for printing on the distendable sheet.

A printing apparatus according to the present invention includes: a printing unit configured to perform printing on a distendable sheet; a thermal expansion machining unit to perform distending the distendable sheet; and a control unit configured to control the printing unit, wherein the control unit causes the printing unit to print a predetermined pattern on a distendable sheet before distending, causes the thermal expansion machining unit to distend the distendable sheet, calculates a displacement amount of the predetermined pattern between before and after distending of the distendable sheet, deforms an original image by a deformation amount determined based on the calculated displacement amount, and causes the printing unit to print the deformed original image as an image for printing on the distendable sheet.

A computer readable non-transitory recording medium storing a control program of a printing apparatus having a printing unit, and a thermal expansion machining unit, the control program causing a computer to execute the process of: causing the printing unit to print a predetermined pattern on a distendable sheet before distending; causing the thermal expansion machining unit to distend the distendable sheet printed the predetermined pattern; calculating a displacement amount of the predetermined pattern between before and after distending of the distendable sheet; deforming an original image by a deformation amount determined based on the calculated displacement amount; and causing the printing unit to print the deformed original image as an image for printing on the distendable sheet.

DETAILED DESCRIPTION OF THE INVENTION

Referring to the accompanying drawings, modes for carrying out the present invention (referred "present embodiments" hereinafter) will be described below in detail. It should be noted that the same numerals are used to designate the same components throughout the entire description of the present embodiments.

(Configuration of Embodiments)

Figure 1:
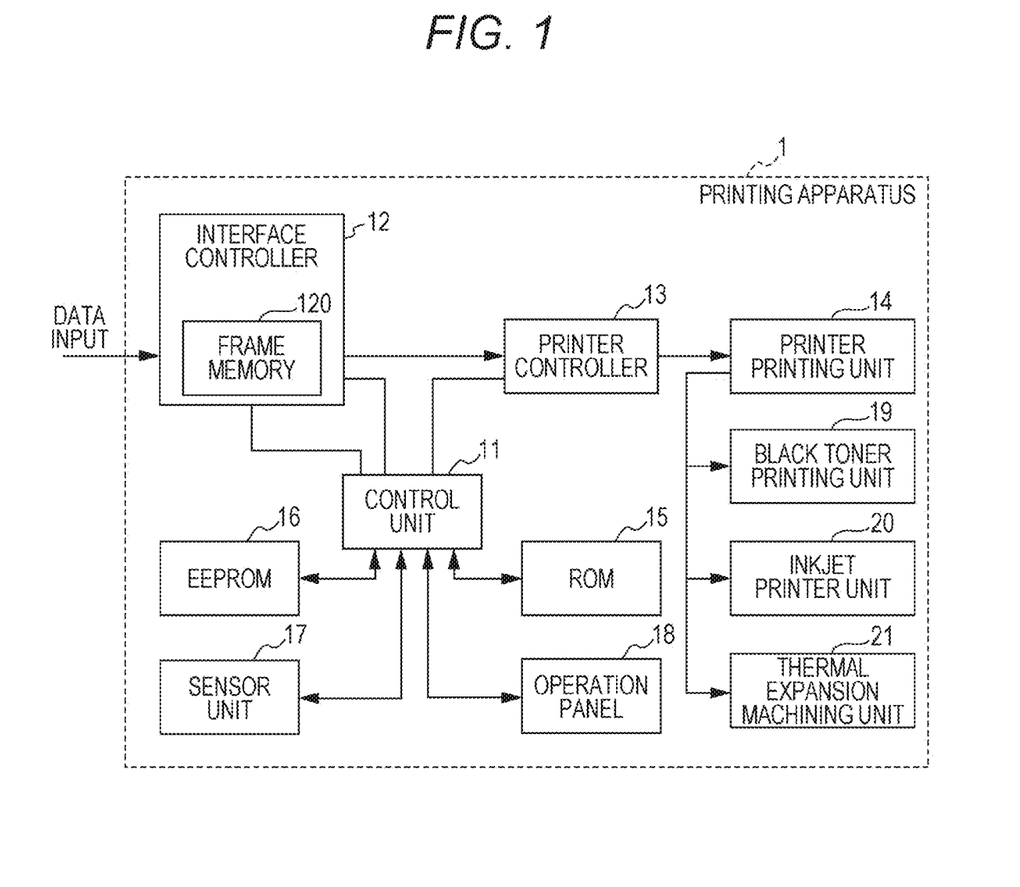
FIG. 1 is a block diagram illustrating a configuration of a printing apparatus according to embodiments of the present invention.

FIG. 1 is a block diagram illustrating a configuration of a printing apparatus according to the present embodiments. As illustrated in FIG. 1, in a printing apparatus 1 of the present embodiments, for example, a control unit 11 on which a microprocessor is mounted serves as a control center. An interface controller 12 and a printer controller 13 are respectively connected to this control unit 11 via data buses.

Further, a ROM (Read Only Memory) 15, an EEPROM (Electrically Erasable Programmable ROM) 16, a sensor unit 17 to which an output from a sensor disposed at each unit is input, and an operation panel 18 are connected to the control unit 11. A program of the present embodiments, to be described below, is stored in the ROM 15, and constants, data, or the like used by the program are stored in the EEPROM 16. It should be noted that the operation panel 18 is a man-machine interface including a touch-type display screen.

The control unit 11 controls the respective blocks and performs the following processing by sequentially reading out and executing the program stored in the ROM 15. In other words, the control unit 11 performs control so as to measure a displacement amount due to distending of a distendable sheet based on a displacement calculation pattern (blue mesh) printed on the distendable sheet after distending, perform deformation processing on an image by the displacement amount measured herein, and print the image on the distendable sheet. Here, the displacement calculation pattern includes a mesh pattern printed with a toner which does not contain carbon black and printed on the distendable sheet before distending. It should be noted that the displacement calculation pattern (predetermined pattern) is not limited to a mesh shape and may be straight lines or curved lines, dots having various sizes, various graphics, characters, symbols, and the like disposed over an entire region on which the image is printed. Further, the amount to be deformation processed is not always needed to be the same as the displacement amount and may be, for example, a desired deformation amount determined based on the displacement amount by multiplying a coefficient capable of obtaining a desired effect or the like.

The control unit 11 can calculate the displacement amount by image processing based on the blue mesh and, for example, a red mesh different from the blue mesh which are obtained by imaging by a camera (not illustrated) or the like. Further, the control unit 11 executes deformation processing of the image to be printed on the distendable sheet after distending by dividing at least a part of the image to be printed into a plurality of polygonal regions and performing trapezoid correction based on the displacement amount for each of the divided regions herein. It should be noted that the control unit 11 may execute the deformation processing by selecting a portion of the image to be printed on the distendable sheet after distending where a spatial frequency is high, or may execute the deformation processing by selecting a portion where a degree of deformation determined by a type of image to be printed on the distendable sheet after distending is large.

The interface controller 12 converts print data supplied from a host apparatus, such as a personal computer (not illustrated), into bit map data and develops the bit map data to a frame memory 120. A storage area corresponding to print data of a black toner K and print data of respective color inks of white W, cyan C, magenta M, and yellow Y is set in the frame memory 120, and the print data of the image of respective colors is developed in this storage area. The developed print data is output to a printer controller 13 and output to a printer printing unit 14 from the printer controller 13.

It should be noted that the printer printing unit 14 is a printer engine. According to a control by the printer controller 13, the printer printing unit 14 controls applied voltages of a rotary driving system including a photoreceptor drum, a primary transfer roller, and the like, an initialization charger, and an image forming unit having a driven unit, such as an optical writing head, and controls a drive output to a process load, such as driving of a transfer belt and a fixing unit (illustration omitted). Further, the printer printing unit 14 controls driving of a conveyance roller pair, light emission and driving of a thermal light radiation unit and timing thereof (illustration similarly omitted). Moreover, the printer printing unit 14 controls operations of the respective parts of an inkjet printer unit 20. The image data of the black toner K output from the printer controller 13 is supplied to the optical writing head (illustration omitted) from the printer printing unit 14. Further, the image data of the respective color inks of white W, cyan C, magenta M, and yellow Y is supplied to a print head.

(Operation of Embodiments)

Figure 2:
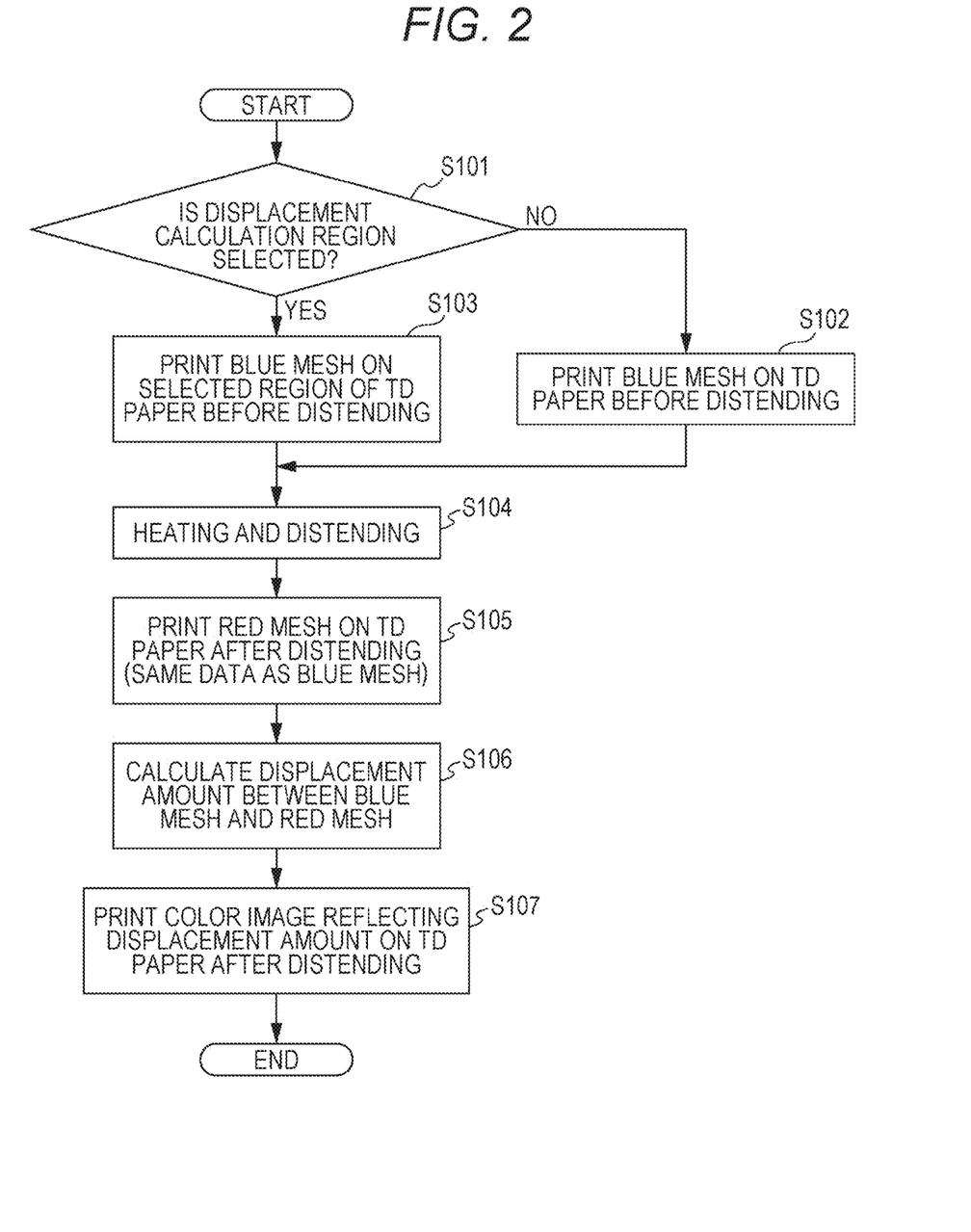
FIG. 2 is a flowchart illustrating processing operation of the printing apparatus according to the embodiments of the present invention.

FIG. 2 is a flowchart illustrating processing operation of the printing apparatus 1 (the control unit 11) of the present embodiments. Referring to FIG. 2 and thereafter, the processing operation of the printing apparatus 1 (the control unit 11) of the present embodiments will be described below in detail. In the following description, a case where a displacement calculation pattern is printed on the entire image is described in Embodiment 1, and description thereof will be given while referring to FIGS. 2 to 8D. Further, a case where a displacement calculation pattern is printed by focusing on a region where distortion is conspicuous is described in Embodiment 2, and description thereof will be given while referring to the flowchart in FIG. 2 and FIGS. 9A to 12B.

First, Embodiment 1 will be described. In FIG. 2, the control unit 11 first determines existence of range selection of a displacement calculation region (step S101). The range selection of the displacement calculation region is executed when a user operates the operation panel 18 while watching a TD image displayed on the touch-type screen.

Figure 3A:
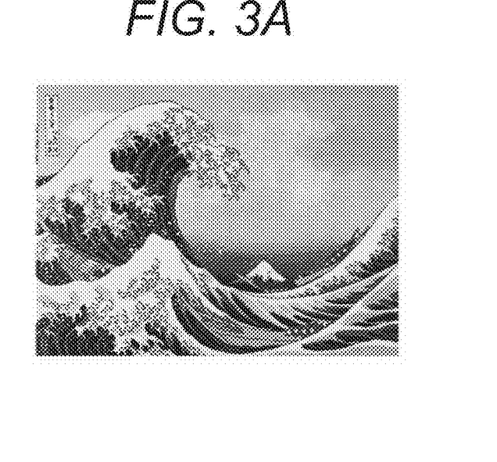
FIGS. 3A and 3B are diagrams illustrating operation of Embodiment 1 obtained by developing on an image.
Figure 3B:
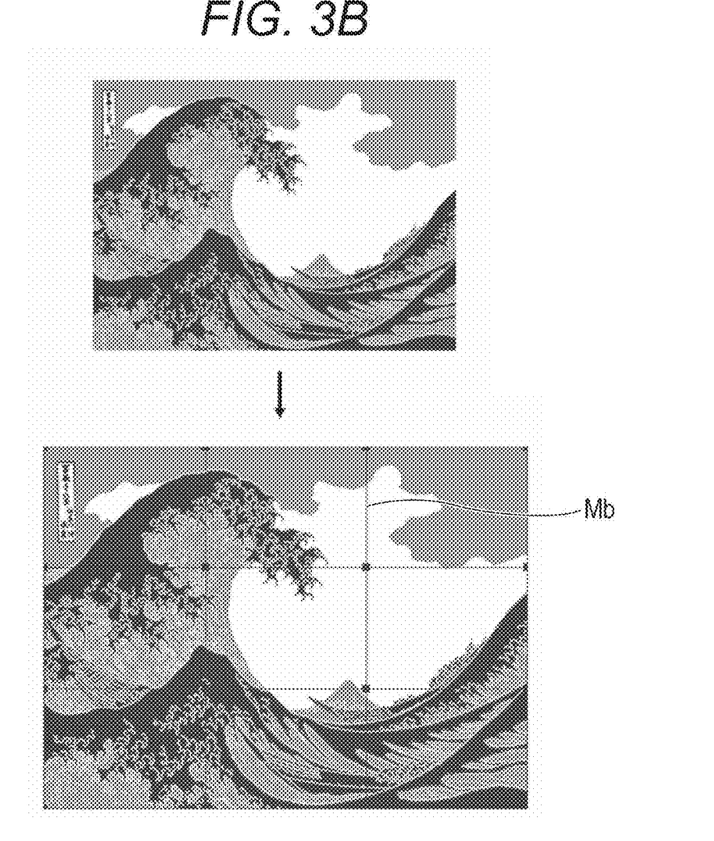

In Embodiment 1, since the range designation of the displacement calculation region does not exist ("NO" in step S101), the control unit 11, for example, prints a displacement calculation pattern formed of a blue mesh Mb illustrated in FIG. 3B on the TD image before distending illustrated in FIG. 3A (step S102). Here, the blue mesh Mb of an arbitrary size is used.

Figure 4A:
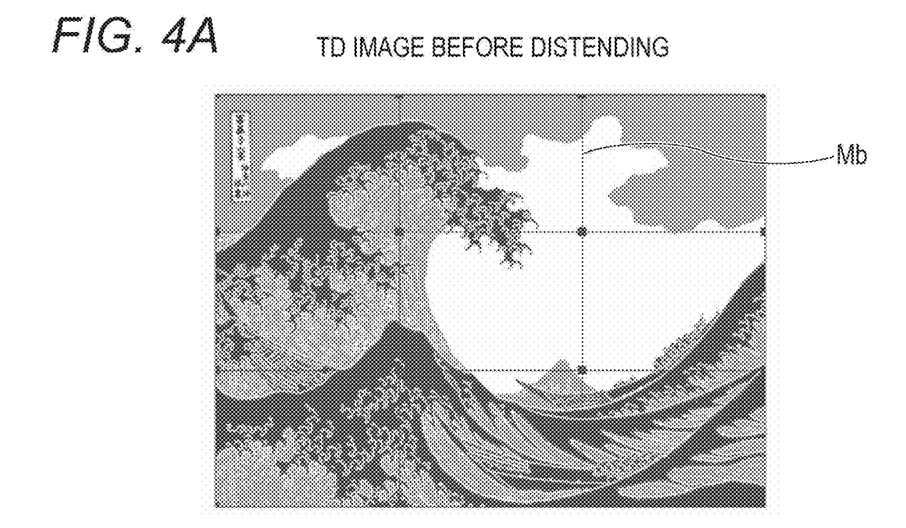
FIGS. 4A and 4B are diagrams illustrating the operation of Embodiment 1 obtained by developing on the image.
Figure 4B:
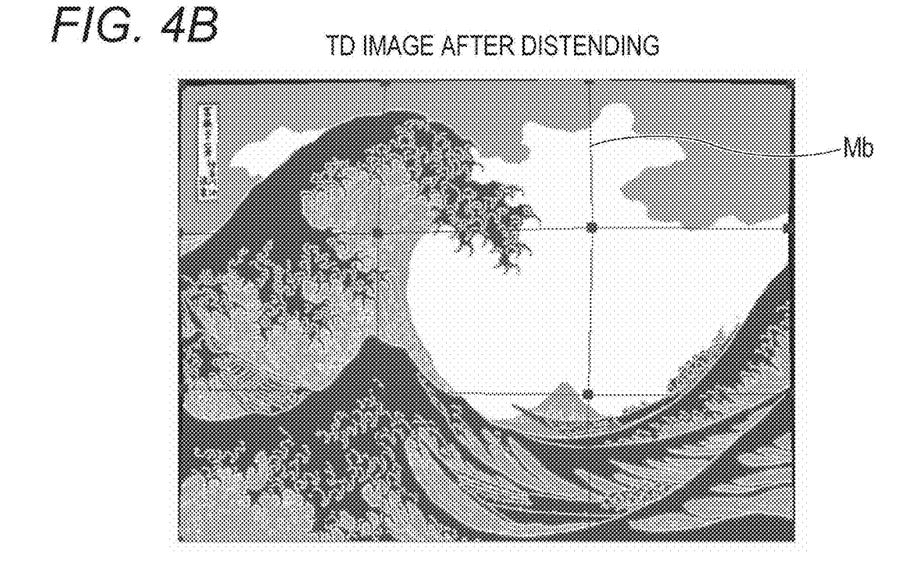

Next, the control unit 11 executes a process to cause a thermal expansion machining unit 21 heating a TD paper and thereby distending the TD paper (step S104). For example, as illustrated in FIG. 4B, a distorted portion appears in the TD image on which the blue mesh Mb has been printed due to the distending and heating. Here, the distending occurs only at a portion printed with gray containing carbon black, and the blue is not distended. Accordingly, distortion (displacement amount) of the blue mesh Mb is a distortion amount of the distendable sheet itself. FIG. 4A illustrates the TD image before distending on which the blue mesh Mb has been printed. Subsequently, the control unit 11 performs control so as to print a red mesh Mr on the TD paper after distending (step S105). It should be noted that the red mesh Mr and the blue mesh Mb have the same data, and a toner which does not contain carbon black is used for the blue mesh Mb.

Figure 5:
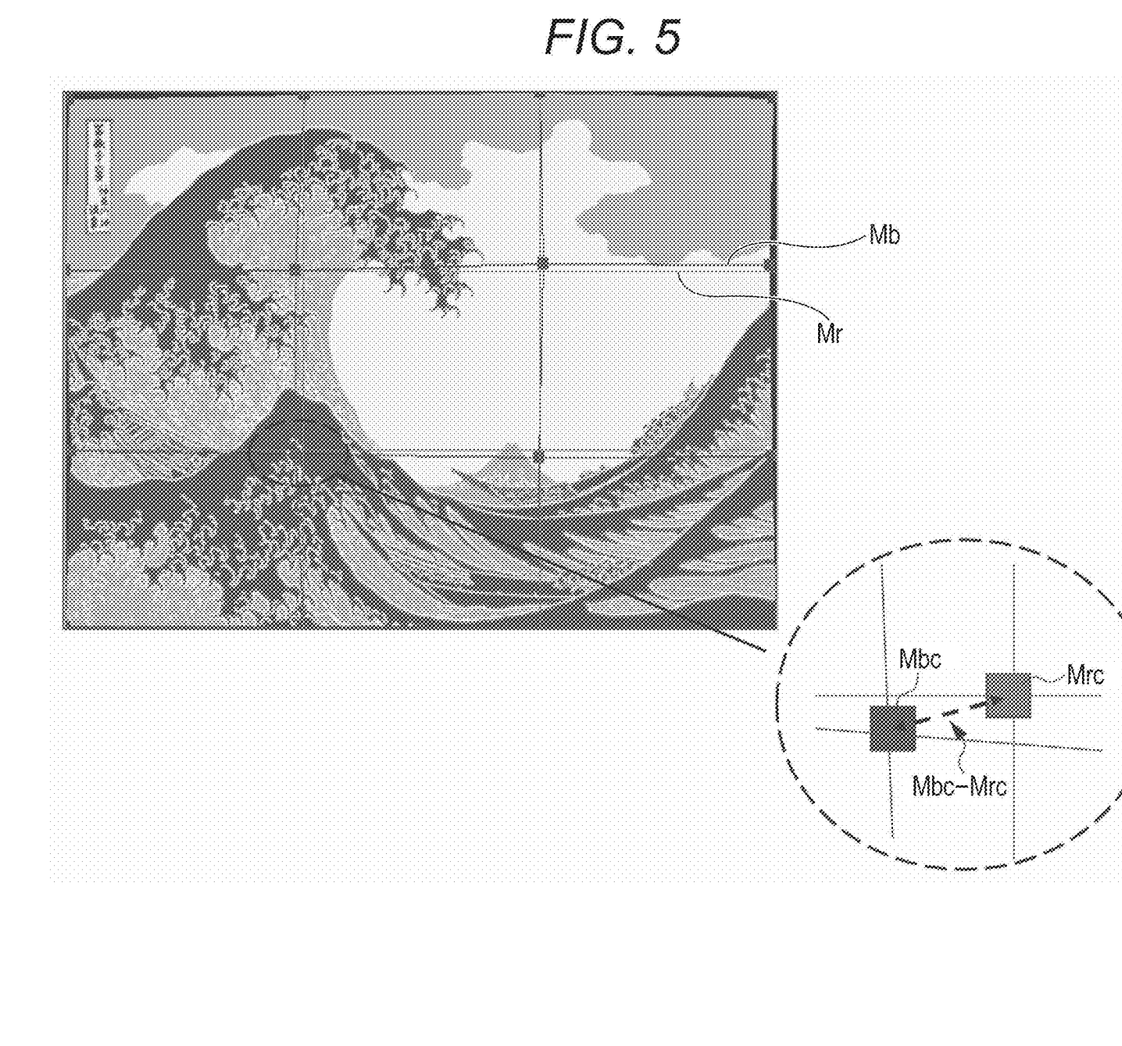
FIG. 5 is a diagram illustrating the operation of Embodiment 1 obtained by developing on the image.

FIG. 5 illustrates a TD image on which the blue mesh Mb and the red mesh Mr have been printed. Since the blue is not distended even when heated, the displacement amount between the red mesh Mr and the blue mesh Mb becomes a distortion amount. A partially expanded view of this displacement is illustrated at a right end in FIG. 5. The displacement amount described herein is a distance Mbc-Mrc between an intersection Mbc of the blue mesh Mb and an intersection Mrc of the red mesh Mr located in the vicinity thereof. Calculation of the displacement amount is performed, for example, by using a camera in a production stage before product shipment (step S106). In other words, the control unit 11 calculates the displacement amount by the image processing from the intersection Mbc of the blue mesh Mb and the intersection Mrc of the red mesh Mr, which are obtained by imaging. The control unit 11 can calculate the displacement amount by converting the number of dots into the distance Mbc-Mrc from the number of dots per unit distance (inch) determined by a resolution of the camera used for imaging.

Figure 6A:
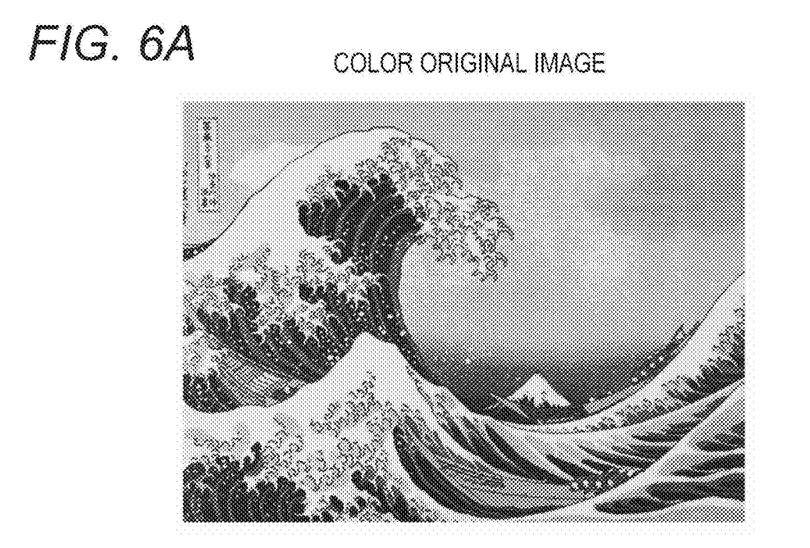
FIGS. 6A and 6B are diagrams illustrating the operation of Embodiment 1 obtained by developing on the image.
Figure 6B:
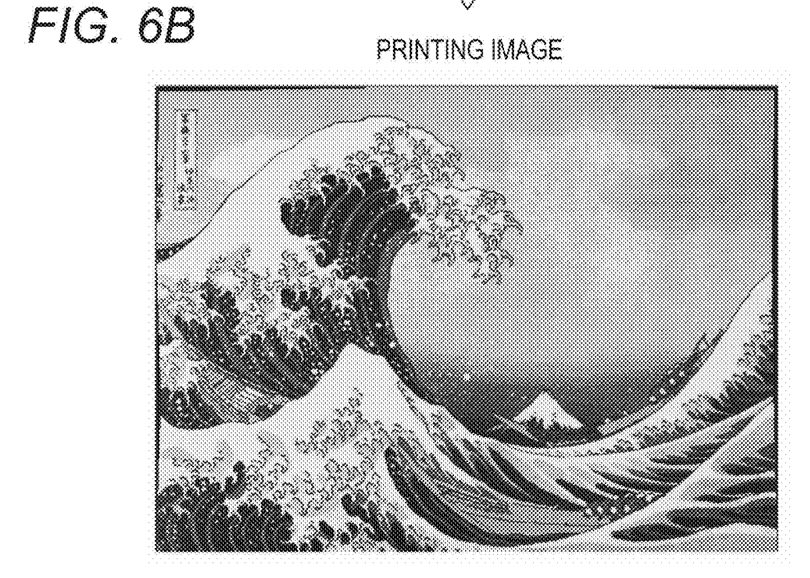

Next, the control unit 11 performs deformation processing on a color original image by the calculated displacement amount, and prints a color image obtained here by the deformation processing on the TD paper after distending. Then, an image without distortion can be generated (step S107). FIG. 6A illustrates the color original image, and FIG. 6B illustrates a final printed image reflecting the calculated displacement amount. By printing this color image on the TD paper after distending, the image without distortion is expressed.

FIGS. 7A to 8D are principle diagrams illustrating trapezoid distortion correction used in the above-described deformation processing. For example, in FIGS. 7A to 7C, in a case where an attention point x within a rectangular region is disposed having an inclination in a horizontal direction, a vertical direction, or both directions, trapezoid distortion occurs in a projected image. In other words, while an image before correction is a rectangle, the projected image is distorted respectively in the horizontal direction and the vertical direction and has a shape different from the original rectangle. Accordingly, in an image after trapezoid distortion correction, a shape of the image returns to the original rectangle by forming the image after correction distorted in a direction opposite to that of the image before correction. In this way, correcting the image in which the trapezoid distortion has occurred to be projected as a rectangle is called trapezoid distortion correction.

Figure 7A:
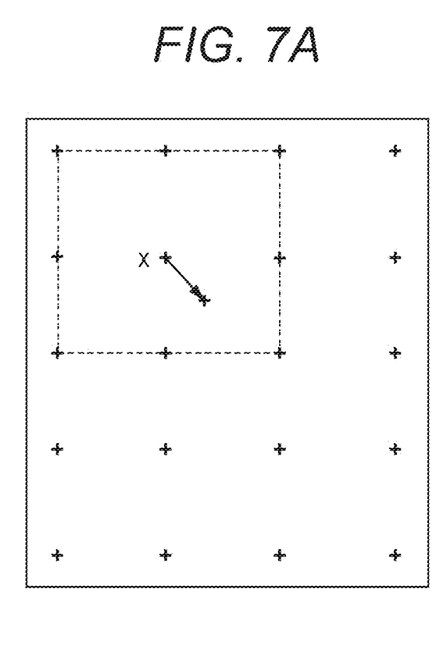
FIGS. 7A to 7C are diagrams referred to in explaining a principle (1) of variant processing operation of Embodiment 1.
Figure 7B:
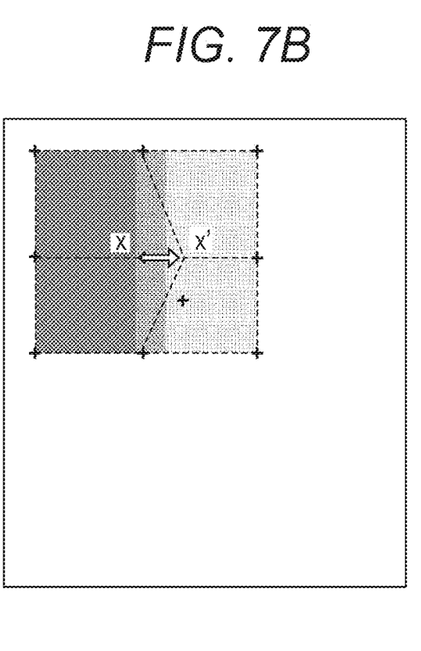
Figure 7C:
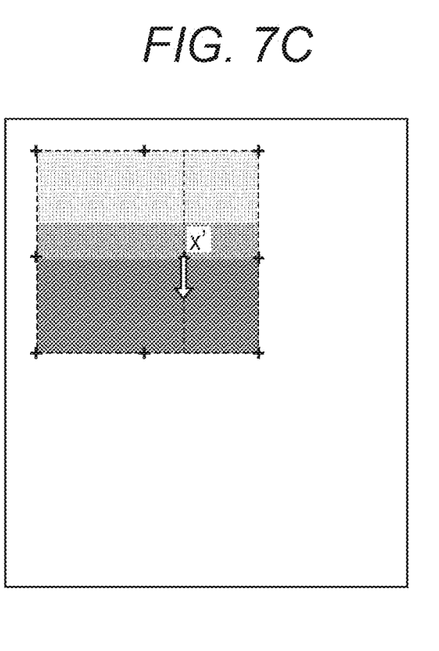

For example, as illustrated in FIG. 7A, in a case where the attention point x is disposed having an inclination in a horizontal direction, a vertical direction, or both directions, the trapezoid distortion occurs in the projected image. As illustrated in FIG. 7B, the control unit 11 first performs linear enlargement reduction deformation of the attention point x only in a horizontal direction (X) (x'). Next, as illustrated in FIG. 7C, the control unit 11 performs linear enlargement or reduction of x' only in a vertical direction (Y). It should be noted that bilinear or bicubic interpolation is used for the enlargement and reduction performed here. The control unit 11 executes the deformation processing by retaining an influence range of the deformation within the smallest rectangle including the attention point x and repeatedly executing this by the number of meshes.

Figure 8A:
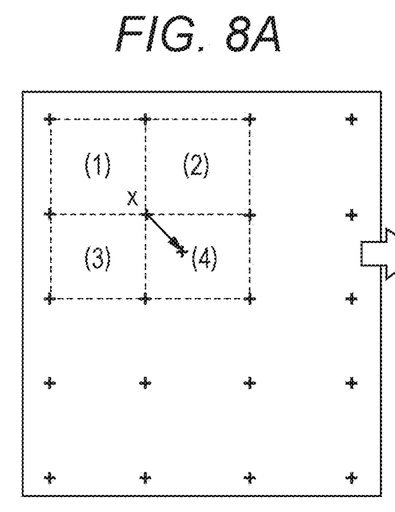
FIGS. 8A to 8D are diagrams referred to in explaining a principle (2) of variant processing operation of Embodiment 1.
Figure 8B:
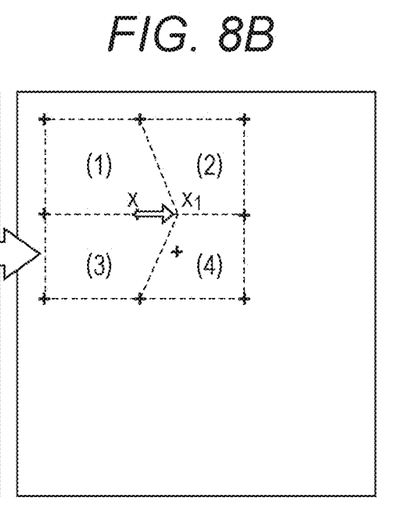
Figure 8C:
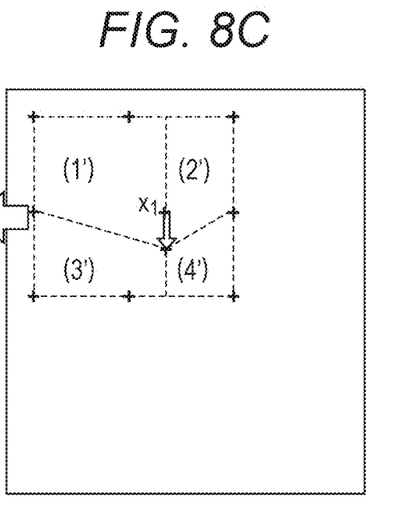
Figure 8D:
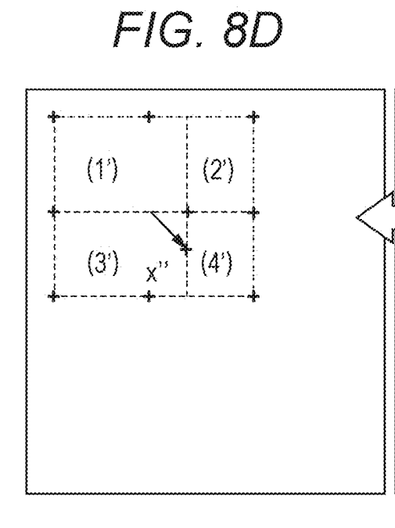
Figure 9A:
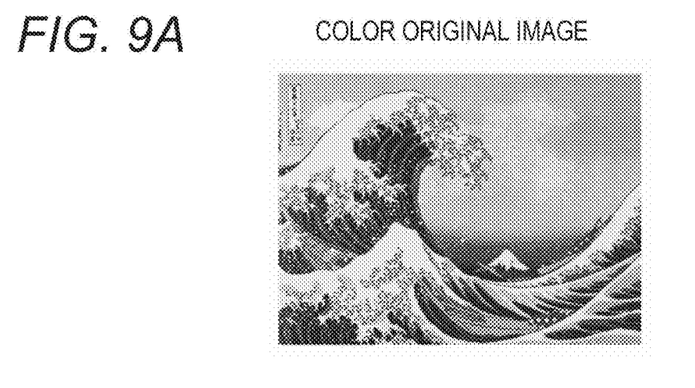
FIGS. 9A and 9B are diagrams illustrating operation of Embodiment 2 obtained by developing on an image.
Figure 9B:
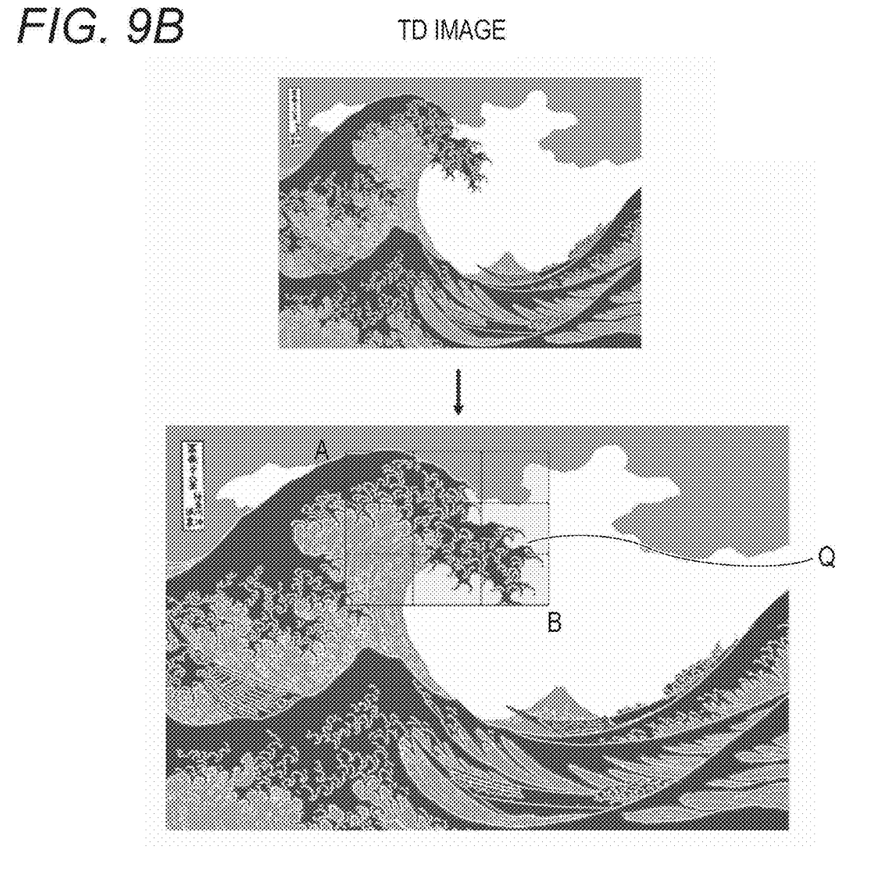

Further, trapezoid distortion correction illustrated in FIGS. 8A to 8D may be performed. In other words, as illustrated in FIG. 8B, first, an image illustrated in FIG. 8A is divided into rectangular regions (1) to (4) and subjected to trapezoid deformation parallel to an X direction ($x_1$). Next, as illustrated in FIG. 8C, trapezoid correction is performed on deformed rectangular regions (1') to (4') parallel to a Y-axis. Then, as illustrated in FIG. 8D, redefinition of the rectangular regions (1') to (4') is performed with respect to the deformed image x".

More specifically, a pixel value of each coordinate of the image after correction is obtained as a calculation pixel calculated by a part of the pixel value of the image before correction and a filter coefficient. Creation of the image after correction corresponds to calculation of the calculation pixel of all the coordinates of the image after correction, and this namely corresponds to the trapezoid distortion correction processing. Regarding the calculation pixel, coordinates (x, y) of the image before correction corresponding to coordinates (X, Y) of the image after correction are calculated by performing coordinate conversion on the coordinates (X, Y) of the image after correction, and the pixel value of the calculation pixel is calculated by convolution operation of a vicinity pixel and a filter coefficient.

When the coordinate conversion is performed, coordinates with a total of eight points including four vertex coordinates (x0, y0), (x1, y1), (x2, y2), (x3, y3) of the image before correction, and four vertex coordinates (X0, Y0), (X1, Y1), (X2, Y2), (X3, Y3) of the image after correction are applied to simultaneous octonary linear equations expressed in the following arithmetic expressions (1), (2), and coordinate conversion coefficients a1 to a8 serving as unknown values are determined

[Mathematical Formula 1]

$$X_i = \frac{a_1 x_i + a_2 y_i + a_3}{a_7 x_i + a_8 y_i + 1} \quad (1)$$

$$Y_i = \frac{a_4 x_i + a_5 y_i + a_6}{a_7 x_i + a_8 y_i + 1} \quad (2)$$

Then the coordinates of the image before correction (coordinates before correction) with respect to respective integer coordinates of the image after correction (coordinates after correction) can be calculated from the above-described coordinate conversion coefficient a1 to a8 and the following arithmetic expression (3).

[Mathematical Formula 2]

$$\begin{pmatrix} X_1 \\ X_2 \\ X_3 \\ X_4 \\ Y_1 \\ Y_2 \\ Y_3 \\ Y_4 \end{pmatrix} = \begin{pmatrix} x_1 & y_1 & 1 & 0 & 0 & 0 & -X_1 x_1 & -X_1 y_1 \\ x_2 & y_2 & 1 & 0 & 0 & 0 & -X_2 x_2 & -X_2 y_2 \\ x_3 & y_3 & 1 & 0 & 0 & 0 & -X_3 x_3 & -X_3 y_3 \\ x_4 & y_4 & 1 & 0 & 0 & 0 & -X_4 x_4 & -X_4 y_4 \\ 0 & 0 & 0 & x_1 & y_1 & 1 & -Y_1 x_1 & -Y_1 y_1 \\ 0 & 0 & 0 & x_2 & y_2 & 1 & -Y_2 x_2 & -Y_2 y_2 \\ 0 & 0 & 0 & x_3 & y_3 & 1 & -Y_3 x_3 & -Y_3 y_3 \\ 0 & 0 & 0 & x_4 & y_4 & 1 & -Y_4 x_4 & -Y_4 y_4 \end{pmatrix} \begin{pmatrix} a_1 \\ a_2 \\ a_3 \\ a_4 \\ a_5 \\ a_6 \\ a_7 \\ a_8 \end{pmatrix} \quad (3)$$

According to Embodiment 1, the pattern for displacement calculation is printed on the image before distending and the same pattern for displacement calculation is printed thereon after distending. Then, the displacement amount of the pattern for displacement calculation before distending and after distending is measured, the original color image is deformed by the displacement amount, and the deformed color image is printed on the TD paper after distending. Therefore, even in a case where the image is distorted due to the irregularities of distending, the color image can be deformed by the amount of distortion and printed. Accordingly, a problem, such as displacement between the distend and the finished color print, is solved, and improvement of print quality in the TD printing can be achieved.

Next, in Embodiment 2, explanation will be given referring to FIG. 2, and FIGS. 9A to 12B. In Embodiment 2, in the flowchart in FIG. 2, it is determined that range selection of a displacement amount calculation region exists in step S101 ("YES" in step S101). Accordingly, the control unit 11 captures the displacement amount calculation region which is selected when a user operates the operation panel 18, and prints a pattern for displacement calculation formed of a blue mesh Mb on the selected region of a TD paper before distending (step S103).

Here, the pattern for displacement calculation is not printed on the entire TD paper as in Embodiment 1. As illustrated in a TD image in FIG. 9B, the pattern is printed on a rectangular region Q where a point A and a point B are diagonal. The region selected here is a region where a change in irregularities (difference in concentrations of the TD image) is remarkably large, a region having no distending part (no TD image) at the periphery, and a region which can be recognized as a block, such as a man, a moon, a mountain, or the like. Further, a blue mesh to be printed is printed with a toner which does not contain carbon black. In other words, the blue is not distended even when heated.

Figure 10A:
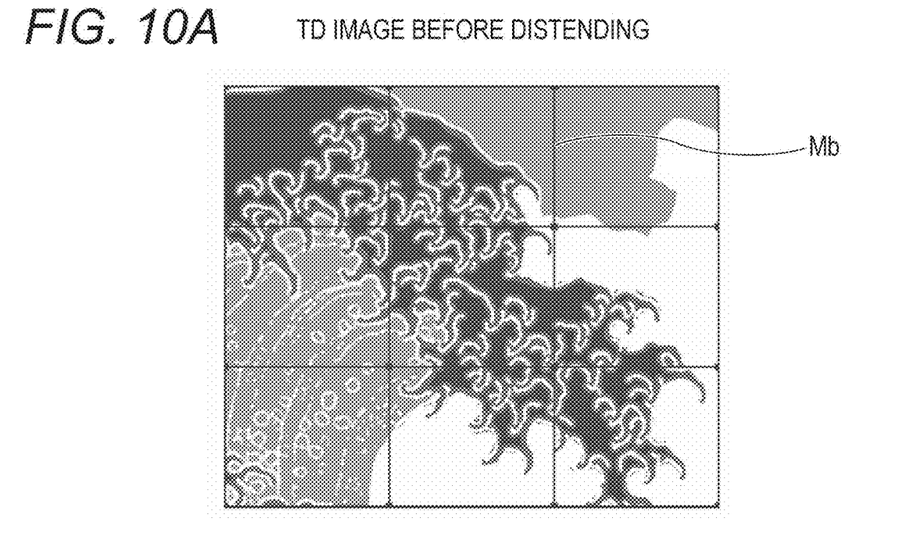
FIGS. 10A and 10B are diagrams illustrating the operation of Embodiment 2 obtained by developing on the image.
Figure 10B:
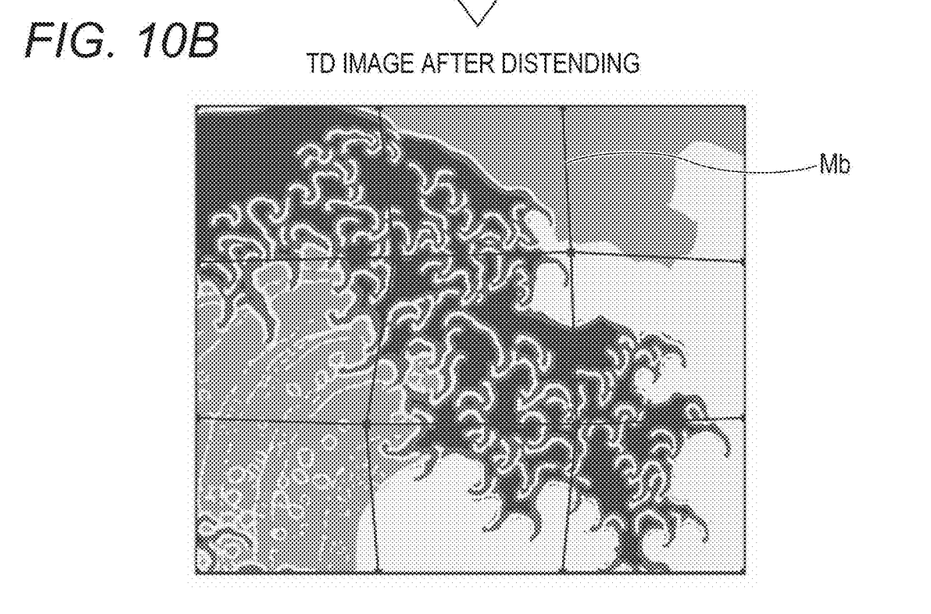

Next, the control unit 11 executes distending and heating processing of the TD paper (step S104). Here, distending occurs only at a portion on which gray containing carbon black is printed, and the blue is not distended. Accordingly, as illustrated in FIG. 10B, a distorted portion appears in the TD image on which a blue mesh Mb has been printed. FIG. 10A is the TD image before distending on which the blue mesh Mb has been printed. Subsequently, the control unit 11 performs control so as to print a red mesh Mr on the TD paper after distending (step S105). It should be noted that the red mesh Mr and the blue mesh Mb have the same data, and an ink which does not contain carbon black is used for the blue mesh Mb.

Figure 11:
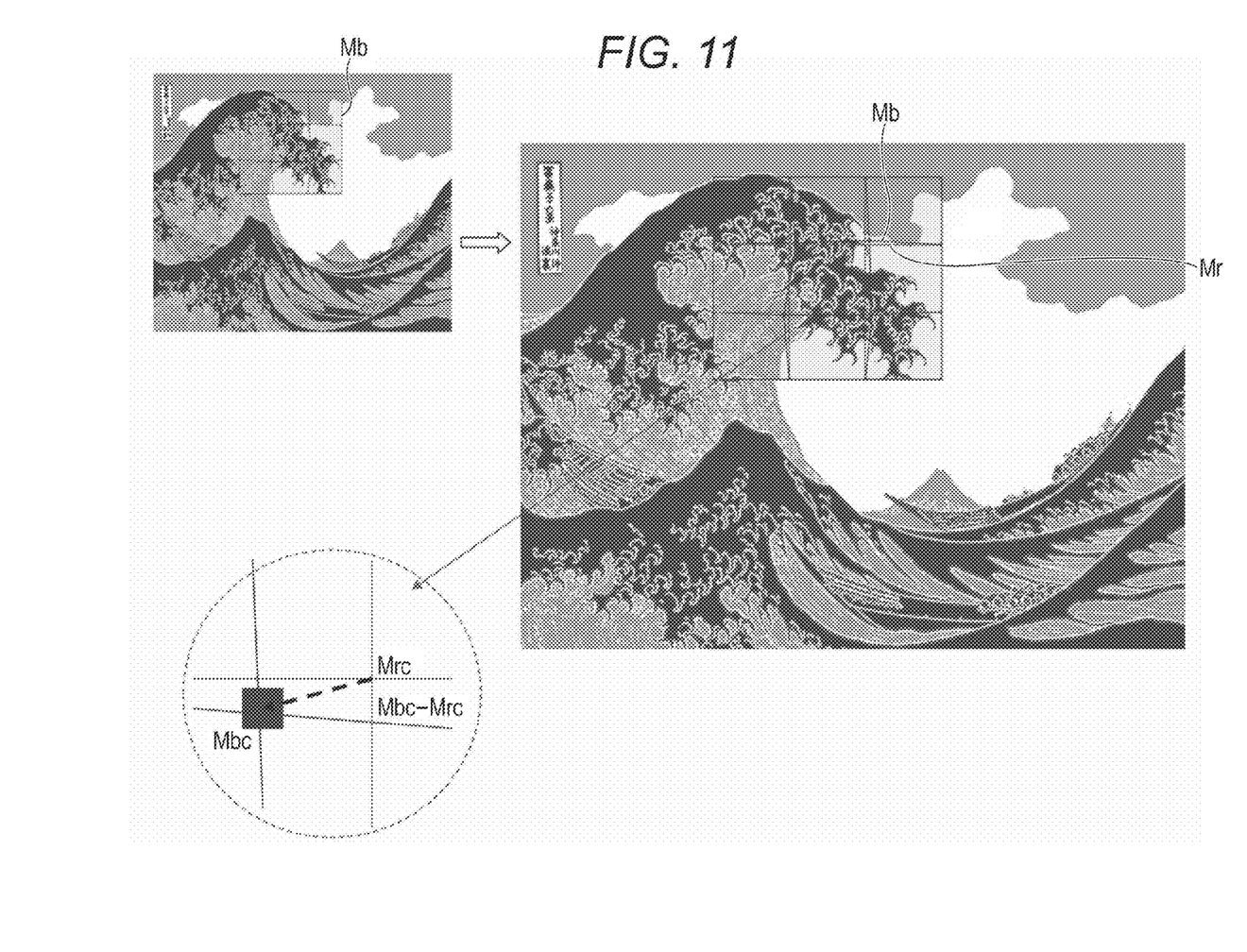
FIG. 11 is a diagram illustrating the operation of Embodiment 2 obtained by developing on the image.
Figure 12A:
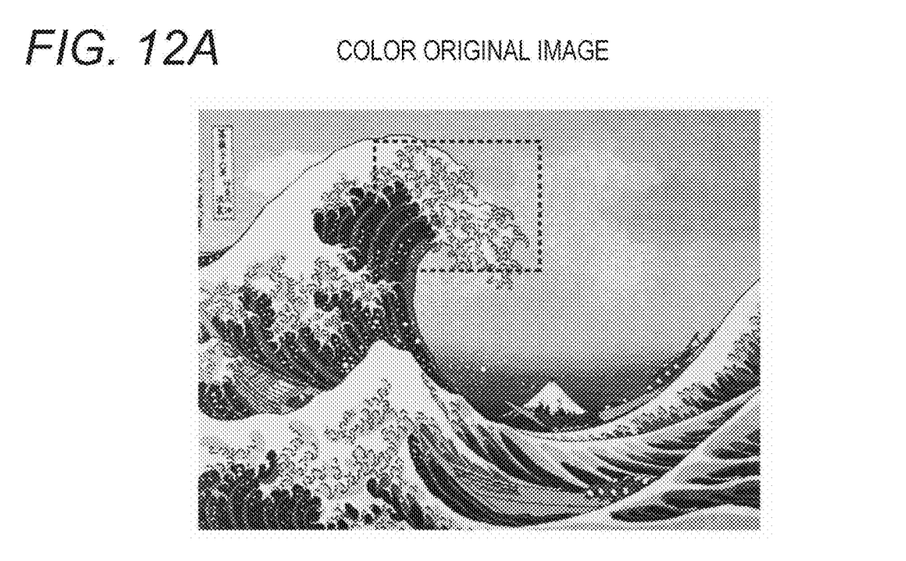
FIGS. 12A and 12B are diagrams illustrating the operation of Embodiment 2 obtained by developing on the image.
Figure 12B:
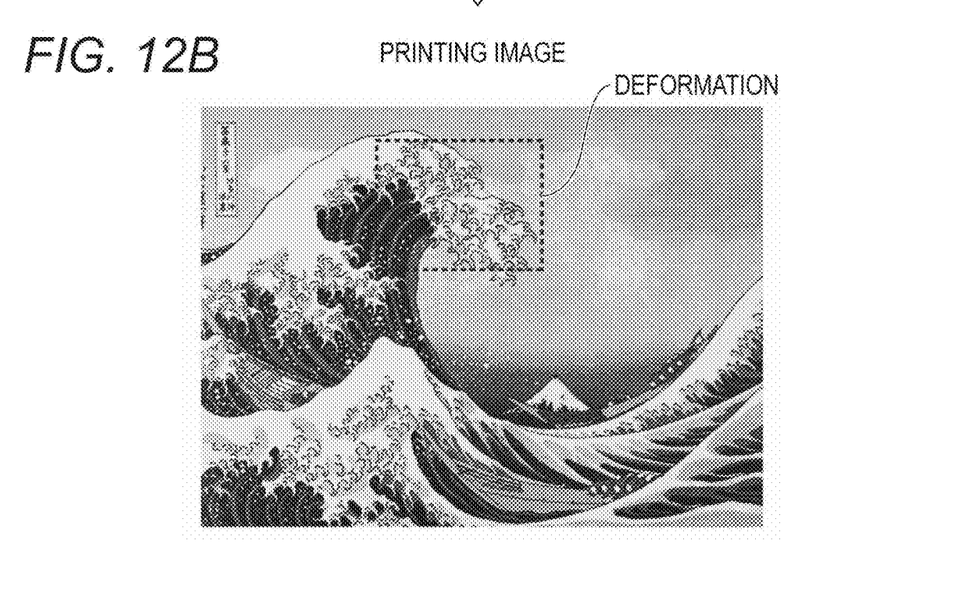

FIG. 11 illustrates the printed TD image on which the blue mesh Mb and the red mesh Mr have been printed. Since the blue is not distended even when heated, the displacement amount between the red mesh Mr and the blue mesh Mb becomes a distortion amount. A partially expanded view of this displacement is illustrated within a dotted circle in FIG. 11. In the same manner as in Embodiment 1, calculation of the displacement amount is executed by image processing using, for example, a camera (step S106). In other words, the control unit 11 calculates the displacement amount by the image processing from the blue mesh Mb and the red mesh Mr which are obtained by imaging. Subsequently, the control unit 11 performs deformation processing on a color original image by the calculated displacement amount, and prints a color image obtained here by the deformation processing on the TD paper after distending. Then, for example, as illustrated in FIG. 12B as the printed image, an image without distortion is generated by the deformation processing (step S107). In the same manner as Embodiment 1, trapezoid distortion correction is performed in the deformation processing, and the deformation processing is executed by the above arithmetic expressions (1) (2) (3). It should be noted that FIG. 12A is the color original image before distending, and a frame surrounded by dotted lines in FIGS. 12A and 12B is a region selected as a range to be corrected.

According to Embodiment 2, in the same manner as Embodiment 1, even in a case where the image is distorted due to the irregularities of distending, the color image is deformed by the amount of distortion and then printed. Accordingly, a problem, such as displacement between the distend and the finished color print, is solved.

Further, measurement points can be reduced by narrowing down the range to be corrected. Alternatively, more detailed correction can be made by having close measurement intervals.

(Effects of Embodiments)

As described above, according to the printing apparatus 1 of the present embodiments, the control unit 11 measures the displacement amount due to distending of the distendable sheet based on the displacement calculation pattern (the blue mesh) printed on the distendable sheet after distending, executes the deformation processing on the image by the measured displacement amount, and prints the image on the distendable sheet. Accordingly, even in a case where the distortion is generated in the image before distending and the image after the distending, improvement of the print quality can be achieved by solving the distortion. Therefore, for example, even in a case where the distortion is generated in the image due to the irregularities of distending, the displacement between the distend and the finished color print is solved, and improvement of the print quality by the TD printing can be achieved.

Further, according to the printing apparatus 1 of the present embodiments, the displacement calculation pattern is printed on the distendable sheet before distending printed with the toner which does not contain carbon black. Accordingly, the displacement amount can be easily measured by a combination of the blue mesh pattern, which is not distended even when heated, and, for example, the red mesh pattern, which is distended when heated. Further, the displacement amount can be automatically measured by calculating the displacement amount by the image processing based on the displacement calculation pattern (the blue mesh) printed on the distendable sheet before distending and the displacement calculation pattern (the red mesh) printed on the distendable sheet after distending.

Further, according to the printing apparatus 1 of the present embodiments, the final color image reflecting the displacement amount can be easily generated by using the trapezoid distortion correction in the deformation processing, and the image without distortion can be expressed by printing this color image on the TD paper after distending. Further, the deformation processing of the image to be printed on the distendable sheet after distending is executed by dividing at least a part of the image to be printed into a plurality of polygonal regions and performing the trapezoid correction based on the displacement amount for each of the divided regions. Accordingly, even in the case where the distortion is generated in the image due to the irregularities of the distending, the displacement between the distend and the finished color print can be easily solved by a low operation load.

Further, according to the printing apparatus 1 of the present embodiments, when the deformation processing is executed by selecting the portion of the image to be printed on the distendable sheet after distending where a spatial frequency is high, or when the deformation processing is executed by selecting the portion where a degree of deformation determined by a type of image to be printed on the distendable sheet after distending is large, the range to be corrected can be narrowed down. By reducing the measurement points, the operation load can be further reduced. It should be noted that the portion where the degree of deformation determined by the type of image to be printed on the distendable sheet after distending is large is, for example, a region where a change in irregularities (difference in concentrations of the TD image) is remarkably large, a region having no distending part (no TD image) at the periphery, and a region which can be recognized as a block, such as a man, a moon, a mountain, or the like. Further, an effect that more detailed correction can be made is obtained by having close measurement intervals.

Though some embodiments of the present invention have been described above, the present invention is not limited to the aforementioned embodiments and includes the invention described in the following claims and their equivalents.

What is claimed is:

1. A printing method comprising the steps of:
   printing a first predetermined pattern based on a certain data on a distendable sheet;
   after printing the first predetermined pattern on the distendable sheet, distending the distendable sheet printed with the first predetermined pattern;
   after distending the distendable sheet, printing a second predetermined pattern based on a data that is the same as the certain data on the distendable sheet;
   after printing the second predetermined pattern on the distendable sheet, obtaining a displacement amount of the first predetermined pattern by comparing the first predetermined pattern printed on the distendable sheet with the second predetermined pattern printed on the distendable sheet;
   after obtaining the displacement amount, deforming an original image by a deformation amount determined based on the obtained displacement amount; and
   after deforming the original image, printing the deformed original image as an image for printing on the distendable sheet.

2. The printing method according to claim 1,
   wherein the printing the first predetermined pattern comprises printing the first predetermined pattern on the distendable sheet by using a toner which does not contain carbon black.

3. The printing method according to claim 1,
   wherein the first predetermined pattern includes at least one of lines, dots, graphics, characters, and symbols.

4. The printing method according to claim 1,
   wherein the printing the first predetermined pattern comprises printing the first predetermined pattern over an entire region on which the image for printing is printed.

5. The printing method according to claim 1,
   wherein the obtaining the displacement amount comprises image processing:
      a first image before the distendable sheet is distended, wherein the first image is an image of the first predetermined pattern printed on the distendable sheet before the distending; and
      a second image after the distendable sheet is distended, wherein the second image is an image of the second predetermined pattern on the distendable sheet indicating displacement of the first predetermined pattern in the first image through the distending.

6. The printing method according to claim 1,
   wherein the deforming the original image comprises:
      dividing at least a part of the original image into a plurality of polygonal regions; and
      performing trapezoid correction based on the displacement amount for each of the divided polygonal regions.

7. The printing method according to claim 1,
   wherein the deforming the original image comprises:
      selecting a portion of the original image where a spatial frequency is high; and
      performing the deformation on the selected portion.

8. The printing method according to claim 1,
   wherein the deforming the original image comprises:
      selecting a portion where a degree of the deformation is large; and
      performing the deformation on the selected portion,
      wherein the degree of the deformation is determined by a type of the original image.

9. A printing apparatus comprising:
   a printing unit configured to perform printing on a distendable sheet;
   a thermal expansion machining unit configured to distend the distendable sheet; and
   a control unit configured to:
      control the printing unit to print a first predetermined pattern based on a certain data on the distendable sheet;
      after printing the first predetermined pattern on the distendable sheet, control the thermal expansion machining unit to distend the distendable sheet printed with the first predetermined pattern;
      after distending the distendable sheet, control the printing unit to print a second predetermined pattern based on a data that is the same as the certain data on the distendable sheet;
      after printing the second predetermined pattern on the distendable sheet, obtain a displacement amount of the first predetermined pattern by comparing the first predetermined pattern printed on the distendable sheet with the second predetermined pattern printed on the distendable sheet;
      after obtaining the displacement amount, deform an original image by a deformation amount determined based on the obtained displacement amount; and
      after deforming the original image, control the printing unit to print the deformed original image as an image for printing on the distendable sheet.

10. A computer readable non-transitory recording medium storing a control program of a printing apparatus having a printing unit, and a thermal expansion machining unit, the control program causing a computer to execute a process of:
   controlling the printing unit to print a first predetermined pattern based on a certain data on a distendable sheet;
   after printing the first predetermined pattern on the distendable sheet, controlling the thermal expansion machining unit to distend the distendable sheet printed with the first predetermined pattern;
   after distending the distendable sheet, controlling the printing unit to print a second predetermined pattern based on a data that is the same as the certain data on the distendable sheet;
   after printing the second predetermined pattern on the distendable sheet, obtaining a displacement amount of the first predetermined pattern by comparing the first predetermined pattern printed on the distendable sheet with the second predetermined pattern printed on the distendable sheet;
   after obtaining the displacement amount, deforming an original image by a deformation amount determined based on the obtained displacement amount; and after deforming the original image, controlling the printing unit to print the deformed original image as an image for printing on the distendable sheet.

11. The computer readable non-transitory recording medium according to claim 10, wherein the printing the first predetermined pattern comprises controlling the printing unit to print the first predetermined pattern on the distendable sheet by using a toner which does not contain carbon black.

12. The computer readable non-transitory recording medium according to claim 10, wherein the first predetermined pattern includes at least one of lines, dots, graphics, characters, and symbols.

13. The computer readable non-transitory recording medium according to claim 10, wherein the printing the first predetermined pattern comprises controlling the printing unit to print the first predetermined pattern over an entire region on which the image for printing is printed.

14. The computer readable non-transitory recording medium according to claim 10,
wherein the obtaining the displacement amount comprises image processing:
a first image before the distendable sheet is distended, wherein the first image is an image of the first predetermined pattern printed on the distendable sheet before the distending; and
a second image after the distendable sheet is distended, wherein the second image is an image of the second predetermined pattern on the distendable sheet indicating displacement of the first predetermined pattern in the first image through the distending.

15. The computer readable non-transitory recording medium according to claim 10,
wherein the deforming the original image comprises:
dividing at least a part of the original image into a plurality of polygonal regions; and
performing trapezoid correction based on the displacement amount for each of the divided polygonal regions.

16. The computer readable non-transitory recording medium according to claim 10,
wherein the deforming the original image comprises:
selecting a portion of the original image where a spatial frequency is high; and
performing the deformation on the selected portion.

17. The computer readable non-transitory recording medium according to claim 10,
wherein the deforming the original image comprises:
selecting a portion where a degree of the deformation is large; and
performing the deformation on the selected portion,
wherein the degree of the deformation is determined by a type of the original image.

18. The printing method according to claim 1,
wherein the obtaining the displacement amount comprises, after distending the distendable sheet, obtaining the displacement amount of the first predetermined pattern using the first predetermined pattern and the second predetermined pattern respectively practically printed on the distendable sheet.

19. The printing method according to claim 18,
wherein the obtaining the displacement amount comprises, after printing the second predetermined pattern:
imaging the distendable sheet on which the first predetermined pattern and the second predetermined pattern have been printed; and
calculating the displacement amount by image processing.

20. The printing method according to claim 18,
wherein the printing the first predetermined pattern comprises printing the first predetermined pattern using a first color, and
wherein the printing the second predetermined pattern comprises printing the second predetermined pattern using a second color different from the first color.

21. The printing apparatus according to claim 9,
wherein the obtaining the displacement amount comprises, after distending the distendable sheet, obtaining the displacement amount of the first predetermined pattern using the first predetermined pattern and the second predetermined pattern respectively practically printed on the distendable sheet.

22. The printing apparatus according to claim 21,
wherein the obtaining the displacement amount comprises, after printing the second predetermined pattern:
imaging the distendable sheet on which the first predetermined pattern and the second predetermined pattern have been printed; and
calculating the displacement amount by image processing.

23. The printing apparatus according to claim 21,
wherein the controlling the printing unit to print the first predetermined pattern comprises controlling the printing unit to print the first predetermined pattern using a first color, and
wherein the controlling the printing unit to print the second predetermined pattern comprises controlling the printing unit to print the second predetermined pattern using a second color different from the first color.

24. The computer readable non-transitory recording medium according to claim 10,
wherein the obtaining the displacement amount comprises, after distending the distendable sheet, obtaining the displacement amount of the first predetermined pattern using the first predetermined pattern and the second predetermined pattern respectively practically printed on the distendable sheet.

25. The computer readable non-transitory recording medium according to claim 24,
wherein the obtaining the displacement amount comprises, after printing the second predetermined pattern:
imaging the distendable sheet on which the first predetermined pattern and the second predetermined pattern have been printed; and
calculating the displacement amount by image processing.

26. The computer readable non-transitory recording medium according to claim 24,
wherein the controlling the printing unit to print the first predetermined pattern comprises controlling the printing unit to print the first predetermined pattern using a first color, and
wherein the controlling the printing unit to print the second predetermined pattern comprises controlling the printing unit to print the second predetermined pattern using a second color different from the first color.

* * * * *